No. 11,720. Reissued Feb. 28, 1899.

T. BRENNAN & E. CHRISTMAN.

SHOE FOR GRAIN DRILLS.

(Application filed Dec. 15, 1898.)

Witnesses.

Edward J. Hart.

Clarence E. Mehlhope

Inventors.

Thomas Brennan,

Edward Christman,

By Arthur Hun,

Attorney.

UNITED STATES PATENT OFFICE.

THOMAS BRENNAN AND EDWARD CHRISTMAN, OF LOUISVILLE, KENTUCKY, ASSIGNORS TO THE BRENNAN & CO. SOUTHWESTERN AGRICULTURAL WORKS, OF SAME PLACE.

SHOE FOR GRAIN-DRILLS.

SPECIFICATION forming part of Reissued Letters Patent No. 11,720, dated February 28, 1899.

Original No. 613,115, dated October 25, 1898. Application for reissue filed December 15, 1898. Serial No. 699,398.

*To all whom it may concern:*

Be it known that we, THOMAS BRENNAN and EDWARD CHRISTMAN, citizens of the United States, residing at Louisville, in the county of Jefferson and State of Kentucky, have invented certain new and useful Improvements in Shoes for Grain-Drills, of which the following is a full, clear, and exact description, reference being had to the accompanying drawings, forming part of this specification.

The invention relates to an improvement in shoes for grain-drills, and has for its object the provision of a removable heel or cutter which can be readily detachable for purposes of sharpening, replacement, or repairs of any kind. In use the lower rear edge or runner portion of the shoe enters the ground, and consequently is subjected to most of the wear and injury by reason of the constant rubbing or friction of the soil and its frequent contact with hard objects, such as stone and the like, and is the part requiring the greatest attention.

The object of the improvement is to produce a shoe with a readily-detachable heel to permit of repair or replacement and at the same time enable its quick adjustment and produce a firm and rigidly-connected shoe which cannot work loose and become disconnected by usage, as will be more fully hereinafter described. To accomplish this desired result, we construct the shoe with the heel attached directly and removably to the shank or extended portion of the grain-tube by a connection independent of the side plates and having no connection whatever with said side plates, except the bearing of their surfaces, and we provide on the upper side of the heel a slotted tenon (one or more may be used) to receive the head of a bolt, which bolt passes up through an opening in the shank and locks the heel rigidly to the shank independent of the side plates. The side plates are riveted at their rear ends directly to the shank and are entirely independent of the heel, so that either the side plates may be removed or the heel may be removed separately and independently without disturbing the other parts.

Figure 1:
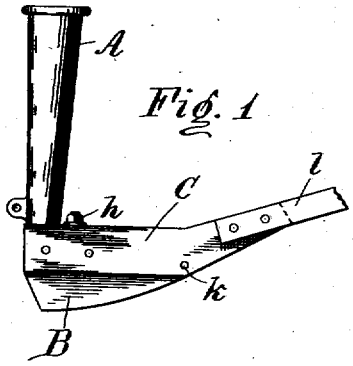
Figure 2:
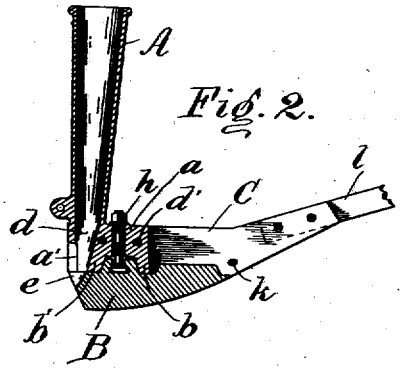
Figure 3:
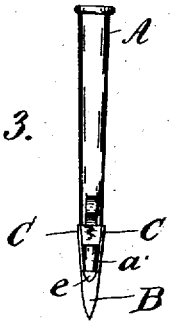
Figure 4:
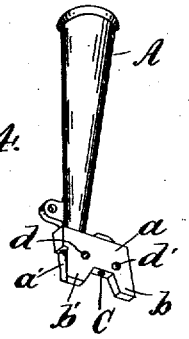
Figure 5:
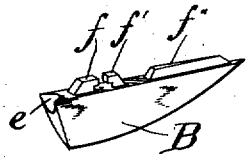
Figure 6:
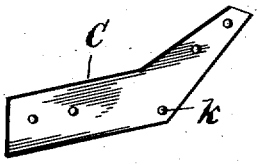

In the drawings, Figure 1 is a side elevation of a drill-shoe embodying the invention. Fig. 2 is a vertical longitudinal sectional view of the same. Fig. 3 is a rear elevation of same, showing the seed-discharge opening. Fig. 4 is a perspective view of the seed-tube. Fig. 5 is a perspective view of the runner or the shoe. Fig. 6 is a perspective view of one of the side plates or brace portion of the drill-shoe.

Like letters of reference indicate identical parts in all the figures.

A is a seed-tube, which is usually made with a contracting orifice for conducting the seed to the furrow or cut made by the runner.

At the lower end of the seed-tube A it is formed with a forwardly-protruding extension or foot *a*, which is preferably made with its opposite faces or sides converging toward the lower and front edges thereof. The seed-conducting orifice of the tube terminates at the rear end of the foot *a*, forming the discharge-opening *a'*. This extension or foot *a* is mortised to receive the tenons *f f'* on the heel, as seen in Figs. 2 and 4. The foot *a* is provided with small screw or rivet holes *d d'*, extending laterally through the same.

B is the cutter or heel portion of the shoe, with a lower edge sloping upwardly at the forward point of the same, thus having its deepest cutting-point at the rear, preferably slightly forward of and below the discharge-opening *a'*. At the upper rear edge this cutter or heel portion may be formed with a cut or scooped out portion *e* to conform with and extend to the discharge-opening *a'*.

The lower rear cutting edge of the runner B terminates, preferably, slightly forward of the upper rear edge thereof, as plainly seen in the drawings.

On the upper side of the heel B are formed tenons *f*, *f'*, and *f''*, which are preferably set within the side edges of the runner B—that is, they are not of the same width as the upper side of the runner B—thus leaving a shoulder on the sides of the tenons *f*, *f'*, and *f''*, as seen in Fig. 5. The locking-tenons *f f'* are made cut away to form a slot to receive between them the head of a bolt or pin *g* and so constructed as to prevent the upward withdrawal of the bolt, as clearly seen in Figs. 2 and 5. The pin or bolt *g* is placed with its head between the tenons *f f'*, which can only be done by sliding it in from the side. The bolt is then passed through the opening or hole *c* in the foot *a* of the seed-tube A and locked or held in place by a nut *h*, thereby drawing the runner B up close against the foot of the seed-tube, the connection of course capable of being made very snug and holding the runner B rigid and preventing any longitudinal play of the same in its connections.

The construction above described is the preferred form, as being the simplest and most effective. Of course the bolt may be connected to the heel in any other well-known manner without departing from the spirit of our invention.

Attached at the sides of the foot *a* and lower end of the seed-tube A and overlapping the tenons on the upper side of the heel B and those on the foot *a* are plates C, which rest on the shoulders or upper side of the heel B alongside of the tenons. These plates C are provided with rivet or screw holes to conform and register with the holes *d d'* of the foot *a*, through which are placed rivets or other suitable fastenings to secure the plates to the sides of the foot. At the forward lower end of these plates C, preferably at the point *k*, they may be riveted or otherwise fastened together, thus clamping between them the tenon *f''* of the runner and preventing any possible side movement of the runner. In practice, however, the clamping effect of the rivets which attach the drag-bars *l* to the forward portion of these side plates is sufficient and the bolt *k* may be dispensed with.

The forward ends of the side plates C project upward and are attached to a drag-bar or draft-strap *l* by rivets or bolts.

Our shoe is so constructed as to permit the use of side plates with straight edges, as shown in the drawings. By the use of such plates the cost of production is very much lessened and the necessity of specially-made shears obviated. In the constructions heretofore in use these plates C have been sheared with a curved edge, which curved edge could only be obtained by using specially-made shears with curved blades, adding to the expense of manufacture of the shoes. With the use of side plates of the construction shown in the drawings, having no curved edges, any ordinary shears may be used to cut the plates C. As has been stated, the portion receiving the most wear is the runner or heel, which is made of tempered steel.

The advantages of our construction over those heretofore in use are very apparent. By constructing a shoe with a detachable heel the expense to the user is greatly reduced and the durability of the shoe greatly enhanced.

The difficulty with the old form of shoe was the necessity in case of repairs by reason of wear or breakage of the heel portion thereof of removing the entire drill-shoe and replacing it by a new one, incurring much loss of time and money. With our construction these difficulties are obviated, as the heel portion of the shoe can be detached in a moment, and in case of breakage a new heel need only be obtained, which can readily and quickly be attached and put in place by the user himself by the mere use of a wrench.

We are aware that shoes with detachable heels have heretofore been made; but with such constructions it has been difficult to obtain a firm and rigid connection and at the same time an easily-detachable heel and to produce as strong a shoe as we are able to obtain by our improved construction. In constructions of this kind it is necessary to avoid the use of rivets passing laterally through the runner portion for attaching it to the remainder of the shoe, as the wear of the soil coming in contact with the rivets might soon work them loose, and the necessity of removing the rivets to detatch the heel is troublesome and expensive, and a very unsatisfactory shoe would be the result. Furthermore, the shoes with detachable heels heretofore constructed have invariably been constructed with the heel riveted to or otherwise fastened to the side plates, necessitating the removal of the rivets in order to remove the heel, whereas in our construction the heel being entirely independent of the side plates can be readily and quickly removed without regard to the side plates, and, furthermore, the side plates themselves can be removed, if necessary, without removing or without regard to the heel.

In our construction the tenon-and-mortise connection directly between the heel and the shank alone provides a perfectly rigid lock between the shank and the heel against all longitudinal strain regardless of the side plates. Furthermore, in this construction side plates with only straight edges may be used.

Having thus described our invention, what we claim, and desire to secure by Letters Patent, is—

1. In a shoe for grain-drills, the combination of a seed-tube having a forwardly-extending foot, an independent heel-piece removably attached to said foot or shank independent of the side plates, substantially as shown and in the manner described.

2. In a shoe for grain-drills, the combination of a seed-tube having a forwardly-extending foot mortised on its lower side, with an independent heel-piece provided with a tenon adapted to fit in said mortise, substantially as and for the purpose described.

3. In a shoe for grain-drills, the combination of a seed-tube having a forwardly-extending foot mortised or recessed on its lower side to receive an upwardly-extending tenon on the heel-piece and a bolt or equivalent fastening for rigidly locking the two parts together, substantially as and for the purpose described.

4. In a shoe for grain-drills, the combination of a seed-tube having a forwardly-extending foot, an independent removable heel-piece, and side plates riveted or secured to the foot and adapted to fit upon the heel-piece, substantially as and for the purpose described.

5. In a shoe for grain-drills, the combination of a seed-tube therefor, an independent heel-piece secured to or held by said seed-tube from longitudinal play, independent of the side plates, substantially as and for the purpose described.

6. In a shoe for grain-drills, the combination of an independent removable heel-piece adapted to be attached directly and independently of the side plates, to the foot of the seed-tube, substantially as shown and in the manner described.

7. In a shoe for grain-drills, the combination of a seed-tube having a forwardly-extending foot and an independent heel therefor, said heel being provided with interlocking tenons with recesses in said foot to receive the same, the tenons on the heel grooved to receive the head of a bolt to lock the parts together, said tenons formed to leave a shoulder to receive the lower edge of the side plates, and both the foot and the heel formed to receive side plates, substantially as and for the purpose described.

THOMAS BRENNAN.
EDWARD CHRISTMAN.

Witnesses:
E. P. BROWN,
G. E. CHRISTMAN.